Oct. 8, 1946.  V. V. MASON  2,408,793
MANUFACTURE OF NUTS AND THE LIKE
Filed Feb. 6, 1943  3 Sheets-Sheet 1
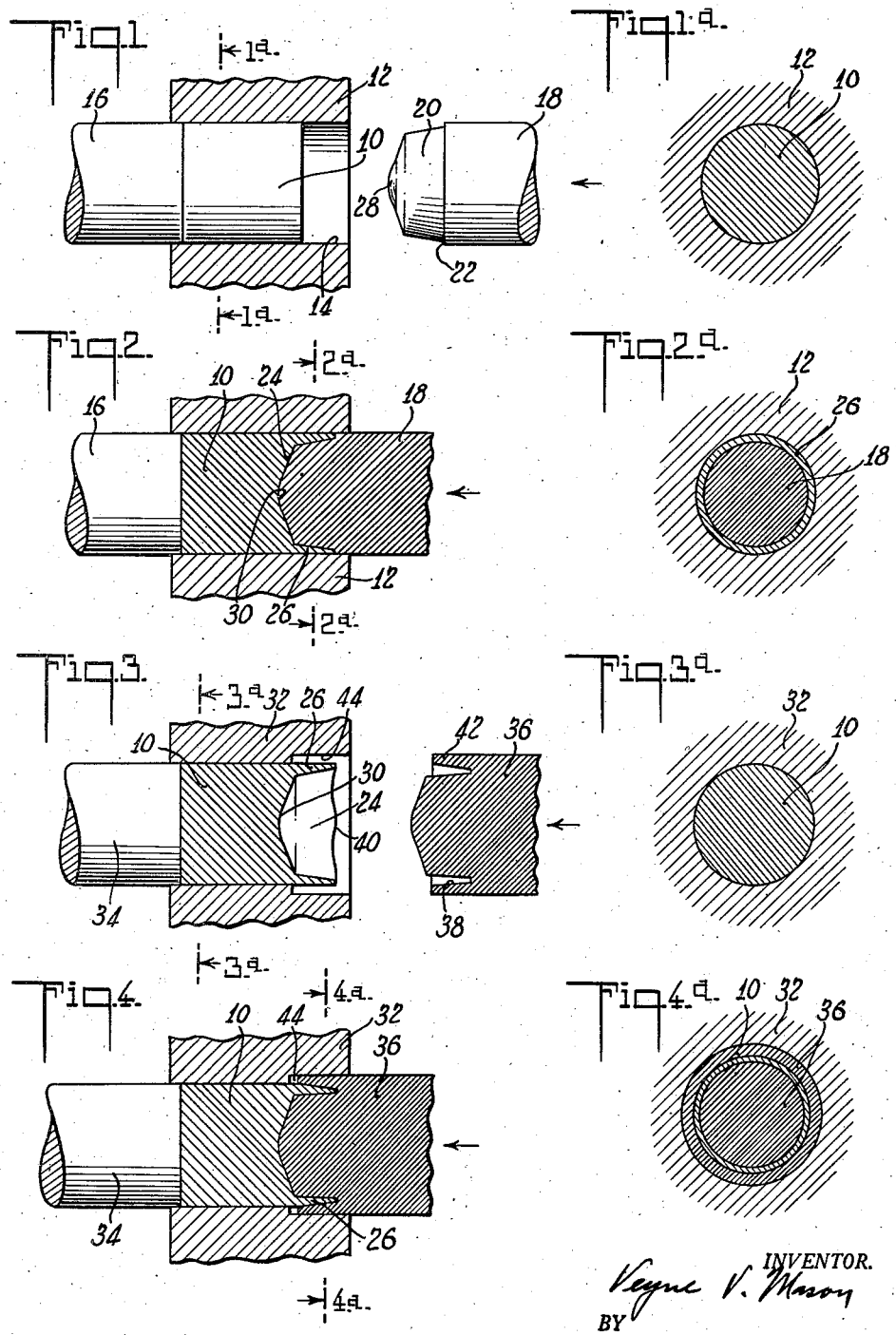
INVENTOR.
Veyne V. Mason
BY
his ATTORNEY

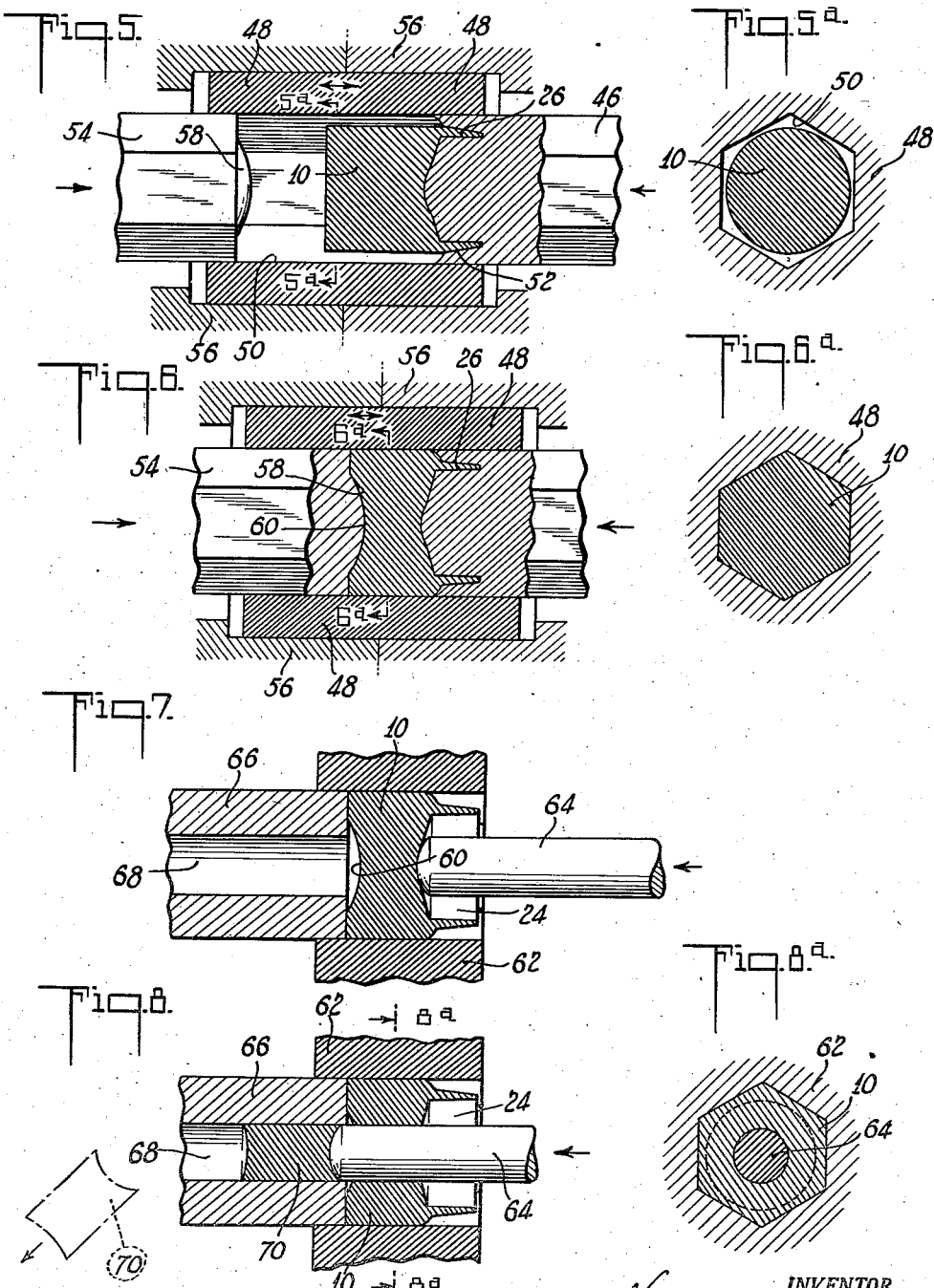

Oct. 8, 1946. V. V. MASON 2,408,793
MANUFACTURE OF NUTS AND THE LIKE
Filed Feb. 6, 1943 3 Sheets-Sheet 3
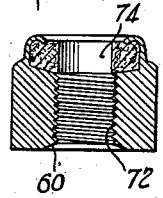
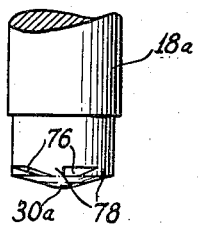
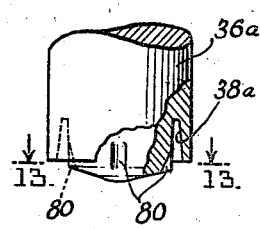
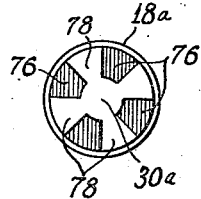
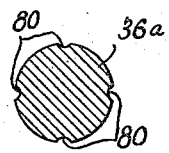
INVENTOR.
Verne V. Mason
BY
his ATTORNEY Patented Oct. 8, 1946

2,408,793

UNITED STATES PATENT OFFICE 2,408,793

MANUFACTURE OF NUTS AND THE LIKE

Veyne V. Mason, Scotch Plains, N. J., assignor to Elastic Stop Nut Corporation, Union, N. J., a corporation of New Jersey Application February 6, 1943, Serial No. 474,931

17 Claims. (Cl. 10—85)

The present invention relates to the manufacture of nuts and the like and has particular reference to the manufacture of metal nut bodies. Still more particularly the invention relates to the manufacture of metal nut bodies for self-locking nuts of the kind in which a locking insert is assembled in the nut body.

The invention will hereinafter be discussed and described in connection with the manufacture of a metal body for a specific kind of self-locking nut, for which the invention is particularly applicable, but it will be understood the invention is not limited in its scope to such specific use but that its principles may be employed in the manufacture of other articles.

One of the most important requirements in the manufacture of self-locking nuts of the locking insert type is to reduce the cost to the minimum in order that such nuts may be made available for use in volume markets where the cost of the article is a primary factor and where heretofore the cost of such special nuts has been prohibitive as compared with ordinary nuts owing to the materially greater number of operations required in order to form and assemble such self-locking nuts. This is particularly true in the case of standard types of nuts, such as the ordinary hexagonal nut, and amongst the general objects of the present invention is that of providing novel method and means for forming nut bodies more rapidly and cheaply than has heretofore been possible while at the same time producing a high quality article.

To this end the invention contemplates novel method and means for cold forging a metal blank by extrusion and upsetting operations to produce a form of blank which has heretofore been obtained through automatic screw machine operations on bar stock. By means of the present invention high speed of production with heading machines of known kind can be obtained and by the nature of the operations performed the articles can be produced with substantially no scrap, both of which factors contribute materially to reduction in cost. Further, through the nature of the operations performed the material is cold-worked in a manner which through the refinement and orientation of grain structure results in a superior product from a given raw material.

A further object of the invention as applied to the specific use of producing bodies for self-locking nuts of the kind in which a locking insert is incorporated, is to enable a recess or well for receiving the insert to be formed in the body which has a configuration which it is not practically possible to provide in bodies produced by the present automatic screw machine methods.

Other and more detailed objects of the invention together with the advantages to be derived from its use will become apparent as this description proceeds which by way of example, but without limitation, will describe the method and means employed to produce a hexagonal nut body of the kind adapted to receive a locking insert.

In the accompanying drawings forming a part hereof:

Fig. 1 is a more or less diagrammatic section showing die and punch means arranged to perform the first operation on a suitable blank or work piece;

Fig. 1a is a section taken on the line 1a—1a of Fig. 1;

Fig. 2 is a view similar to Fig. 1 showing the parts after the first operation has been performed;

Fig. 2a is a section taken on the line 2a—2a of Fig. 2;

Fig. 3 is a view similar to Fig. 1 but showing the blank at a second station preparatory to the performance of the second operation;

Fig. 3a is a section taken on the line 3a—3a of Fig. 3;

Fig. 4 is a view of the parts shown in Fig. 3 after the second operation has been performed.

Fig. 4a is a section taken on the line 4a—4a of Fig. 4;

Fig. 5 is a view similar to Fig. 1 showing the blank at a third station preparatory to the performance of the third operation;

Fig. 5a is a section taken on the line 5a—5a of Fig. 5;

Fig. 6 is a view of the parts shown in Fig. 5 after the third operation has been performed;

Fig. 6a is a section taken on the line 6a—6a of Fig. 6;

Fig. 7 is a view similar to Fig. 1 showing the blank at a fourth station preparatory to the performance of the fourth operation;

Fig. 8 is a view of the parts shown in Fig. 7 after the performance of the fourth operation;

Fig. 8a is a view taken on the line 8a—8a of Fig. 8;

Fig. 9 is a section of a completed nut formed from the nut body produced by the operations shown in the preceding figures;

Fig. 10 is a fragmentary side view of a punch adapted to form a recess of special configuration in the nut body;

Fig. 11 is an end view of the punch shown in Fig. 10;

Fig. 12 is a fragmentary view of another punch adapted to form a recess of special configuration; and Fig. 13 is a section taken on the line 13—13 of Fig. 12.

Referring now to the drawings, a blank 10 in the form of a cylindrical slug, advantageously obtained by shearing off a suitable length of stock from round wire or bar stock, is placed in a die 12 having a cylindrical bore 14. At one end the blank is supported by a backing punch 16 and in the first operation the opposite end of the blank is recessed by means of a punch 18 having a nose portion 20 in the form of a truncated cone, with preferably a shoulder 22 between the base of the conical portion and the main body portion of the punch, the latter portion having substantially the same diameter as that of the die bore 14. The nature of the first operation will readily be seen from observation of Figs. 1 and 2, punch 18 being moved to the left to the position shown in Fig. 2, thereby forging a conical recess 24 in one end of the blank by what may be termed a compression extrusion action which causes the material of the blank to be extruded into the space between the die bore and the nose of the punch to form the wall 26 around the recess. For reasons hereinafter explained, the punch 18 may advantageously be provided with a small circular bulge 28 on its forward end, whereby to form a small depression 30 centrally located in the base of the recess.

For the second operation the blank is ejected from die 12 and inserted in a die 32, with which are associated a backing punch 34 and a forming punch 36. By reference to Figs. 2 and 3 it will be seen that as originally formed the wall 26 of the recess has a cylindrical outer surface and an outwardly tapering or conical inner surface. By the second operation the punch 36 reverses these configurations, the punch being provided with a circular groove 38 the outer wall of which is tapered and the inner wall of which is substantially cylindrical, having only enough taper or "draft" to permit the punch readily to be withdrawn from the recess of the blank after the forming operation has been performed as shown in Fig. 4.

In the first operation the flow of material under the impact of the punch will be sufficient to square the end of the blank which abuts the punch 16 and the end of the extruded wall may or may not entirely fill the cavity between punch and die. The extended end may have a slightly wavy contour as indicated at 40 in Fig. 3. In the second operation, due to circumferential compression of the wall 26, metal is available to completely fill the groove 38 in punch 36 and insure an even end edge or surface on this wall. In order to insure sufficient strength for the part of the punch 36 outside of groove 38, the punch may be made with a substantial wall 42 outside this groove, this portion of the punch being received in a counterbore 44 in die 32.

After the second operation the blank is ejected and transferred to a position to be picked up and in effect impaled upon a punch 46 cooperating with a forming die 48 having a hexagonal bore 50 the inscribed diameter of which is slightly greater than the diameter of the blank 10. Punch 46 is formed with a groove 52 the contour of which is made to fit the wall 26 of the blank as formed by the second operation. For the third operation the wall 26 of the recess in the blank, fitting in the groove 52 in the punch, provides the means for locating the blank radially with reference to the wall of the bore or cavity of the die, and the punch 54 which abuts against the opposite end of the blank moves inwardly into the die toward the punch 46. As the two punches move toward each other the portion of the blank which is not supported by the walls of the groove 52 in punch 46 is compressed or upset to the hexagonal section of the die cavity, and as will readily be seen the recess in the blank will be exactly centered with respect to the main body portion of the now hexagonal blank by virtue of the locating of the blank in the die through the use of the cooperating punch and recess. Also, instead of being fixed axially the die 48 is preferably mounted in a holder 56 permitting the die to have limited axial movement or in other words to "float." With this arrangement, coupled with the locating of the blank radially in the cavity by means of the punch, maximum freedom of flow for the material being upset is provided. This contributes materially toward the obtaining of uniformity of grain structure and the elimination of both localized overworking and surface spalling due to axial flow of material along the wall of the die. For a purpose to be described, the punch 54 is advantageously provided with a centrally located circular bulge 58 for impressing an indentation 60 in the base end of the blank, this indentation being somewhat larger in diameter than the indentation 30 in the bottom of the recess 24.

After the third operation the blank is ejected from die 48 and transferred to die 62 having an hexagonal bore fitting the body of the blank. While in this die the blank is pierced by means of a punch 64, the diameter of which is smaller than that of the recess 24, the blank being backed during this operation by a backing punch 66 having a bore 68 for receiving the slug 70 from the pierced blank.

The blank is now ready for the subsequent operations of threading the small diameter pierced bore, insertion of a locking insert in the recess 24 and crimping of the top of the flange 26 over the insert to lock the insert in place, whereby to produce a self-locking nut of known kind as shown in Fig. 9. These operations are all known and need not be described herein but it is to be noted that the countersink for the threaded bore 72 is provided by the rim of the depression 60 impressed in the blank during one of the blank forming operations.

While the various forming operations may be carried out in various different ways they are very advantageously and rapidly carried out by the aid of a multiple station heading machine in which the blank is transferred to a different die for each operation by suitably timed transfer fingers, the blank being ejected to or inserted from the fingers by one of the punches. Heading machines for effecting such transfer operations are well known and need not be described herein. Obviously, other routines may be followed, as for example, by performing the first and second operations above described while keeping the blank in the same die and bringing different forming punches into action with the one die in order to effect the two operations. Likewise the third and fourth operations might be accomplished with different sets of punches working with the same die.

In order to illustrate the general principles contemplated by the invention the punches 18 and 36 for the first two operations have been shown contoured to provide a plain cylindrical recess for the reception of the locking washer 74 shown in Fig. 9. However, the described method, when employed to form blanks for nuts of the specific kind illustrated in Fig. 9, provides other important advantages in that the recess may with equal facility and speed be made with depressions and projections in either the bottom or side walls, or both, for the purpose of holding the locking insert against rotation in the recess after it is assembled in the nut. If for example it is desired to provide alternating projections and depressions in the bottom of the recess the forming punch for the first operation may be formed as shown in Figs. 10 and 11, the punch 18a having the portion of its end face outside of the projection 30a formed to provide a series of shallow wedge-shaped depressions 76 separated by alternating similarly shaped projections 78. Obviously other configurations may be employed, the primary object being to provide projections which will be impressed into the material of the locking insert when the nut is assembled. Particularly for large nuts, the locking insert is frequently made up of two or more separate washers superimposed in the recess. In such cases it is particularly advantageous to have each individual washer engaged by projections to prevent its turning and for this purpose side wall projections, preferably in the form of ribs, may be formed. Preferably, side wall ribs are formed by employing a ribbed punch, such as that shown in Figs. 12 and 13, for the second operation. In this punch, 36a, axially extending grooves 80 are formed in the central plug portion or nose of the punch which provides the inner wall of the groove 38a, and as will be appreciated from a consideration of Figs. 3 and 4, the second operation, performed with this punch, can be made to produce the desired ribs on the side wall of the recess. The rib forming grooves are preferably tapered and, as shown in Fig. 12, also preferably stop short of the full depth of the groove 38a, so that the upper end of the flange 26, which is crimped over the locking insert when the nut is assembled, is not ribbed.

It will be apparent that both bottom and side wall projections can be formed in the recess by a single punch having its end and side faces suitably shaped, and also that the procedure may be varied, insofar as the first and second operations are concerned, with respect to the one or ones of these operations in which bottom and/or side wall projections are formed. It further will be understood that in any event the punch engaging the recessed end of the blank for the third operation will be shaped complementary to the shape of the recess so as to fully support the wall thereof during the upsetting operation.

From the foregoing description it will be apparent that the invention is applicable to the manufacture of articles of a variety of specific configurations and that various changes may be made in the specific design and application of the tools without departing from the spirit or scope of the invention as defined in the appended claims.

What is claimed is:

1. The method of forming a nut body which includes the steps of compressing a die enclosed blank to form a recess in one end of the blank, utilizing the wall of said recess to locate the blank radially with respect to a forming die having a cross-sectional configuration different from that of the cross-sectional configuration of the blank, and compressing the blank while so located to upset the material of the blank to an external cross-sectional configuration conforming with that of the die.

2. The method of forming a nut body having a portion of polygonal cross-section from round bar stock which consists in compressing a die enclosed blank of said stock to form a recess in one end of the blank, utilizing the wall of said recess to locate the blank radially with respect to a forming die having the desired polygonal cross-sectional configuration, and compressing the blank while so located to upset the material of the blank to an external configuration conforming with that of the die.

3. The method of cold forging an hexagonal nut body adapted to receive a locking insert which includes the steps of placing a cylindrical metal blank in a cylindrical die recess, punching one end of the blank with a tapered cylindrical punch to extrude the end portion of the blank around the punch within the die, whereby to form a circular well in one end of the blank defined by a wall having an internal tapered and an external cylindrical surface, working said wall by a subsequent punching operation to provide a substantially cylindrical internal surface and a tapered external surface, and subsequently upsetting the blank in an hexagonal die by a punch having an engaging end recessed to receive and support said wall to prevent distortion thereof during the upsetting operation.

4. The method of forming a nut body which includes the steps of punching a die enclosed blank to form a recess by extruding a generally circular flange between the die and the punch, subsequently supporting said flange in a suitably formed groove in another punch and upsetting the unsupported portion of the blank in a die of desired configuration while said flange is supported by said punch.

5. The method of forming a body for a self-locking nut of the kind having a locking insert assembled therein which includes the steps of forming a recess in one end of a blank of bar stock by extruding a circular flange from one end of the blank to form the wall of the recess, subsequently upsetting the body portion of the blank by a punching operation while supporting said flange in a suitably grooved punch, and thereafter piercing said body portion to provide a bore therethrough in alignment with and having a diameter less than that of the recess.

6. For the manufacture of forged metal nut blanks, a die having a circular bore, a cooperating backing punch arranged to enter and fill one end of said bore and back a blank therein and a cooperating forming punch adapted to enter the opposite end of said die, said forming punch having an annular groove in its working end, the inner wall of said groove being substantially cylindrical and the outer wall thereof tapering inwardly from a diameter at the working end of the punch equal to at least the diameter of a blank held in the die bore.

7. For cold forging metal articles, a die having a bore therethrough, and two confronting punches adapted to enter and fill the opposite ends of said bore, said punches being fixed radially with respect to said bore, and one of said punches having its working end shaped to engage and locate radially within the die cavity a blank smaller transversely than the die cavity and to be upset between said punches.

8. For cold forging metal articles, a die having a bore therethrough, and two confronting punches adapted to enter and fill the opposite ends of said bore, said punches being fixed radially with respect to said bore and one of said punches having its working end shaped to engage and locate radially within the die cavity a blank smaller transversely than the die cavity and to be upset between said punches, said punches each moving toward the other in substantially fixed paths of travel and said die being movable in a direction coaxial with the directions of movement of the punches.

9. A forged metal nut blank comprising a main body portion and a circular flange portion extruded from one end of the main body portion and defining the side wall of a recess, said extruded portion including a plurality of axially extending ribs projecting inwardly from said side wall, and a bore of smaller diameter than that of said recess and coaxial therewith extending from the bottom of the recess through the main body portion of the blank.

10. A blank as set forth in claim 9, in which said ribs are tapered.

11. A blank as set forth in claim 9, in which said ribs terminate short of the top of said flange portion.

12. A blank as set forth in claim 9, in which said ribs are tapered and terminate short of the top of said flange portion.

13. The method of cold forging from round bar stock a nut body adapted to receive a locking insert which includes the steps of compressing a die enclosed blank of said stock to form an outwardly tapering recess in one end of the blank defined by a wall having a conical inner surface and a cylindrical outer surface, working said blank to compress said wall peripherally to alter said conical inner wall surface to substantially cylindrical form, whereby to provide a substantially cylindrical recess for the reception of a locking insert, and additionally working the remaining portion of the body of the blank by axial compression within a suitably shaped die cavity to provide desired external cross sectional configuration of said portion while supporting said wall to prevent undesired distortion thereof during the shaping of said body portion.

14. The method set forth in claim 13, in which said wall is supported to retain its circular shape for subsequent shaping over a locking insert in the recess while the remaining body portion is axially compressed in a die having a cavity of polygonal cross section to form a body portion having flat surfaces for engagement by a wrench.

15. The method set forth in claim 13 in which said axial compression is effected in a die axially movable in the direction of said compression, whereby to minimize the relative axial movement between the compressed metal and the wall of the die cavity.

16. For cold forging a metal blank having a recess in one end, a die having a bore therethrough with a portion providing a die cavity larger transversely than the blank, and two confronting punches fixed radially with respect to said die and filling the opposite ends of the bore, one of said punches having a working face shaped to enter said recess and radially support the wall thereof, said punches being mounted for relative motion toward each other to compress and upset the blank between them and thereby expand the unsupported portion of the blank radially to conform with said die cavity and said die being movable in a direction coaxial with the direction of said relative movement of the punches.

17. Apparatus as set forth in claim 16 in which said die cavity is polygonal in cross section for the production of a body portion having flat surfaces for engagement by a wrench.

VEYNE V. MASON.